Figure 1:
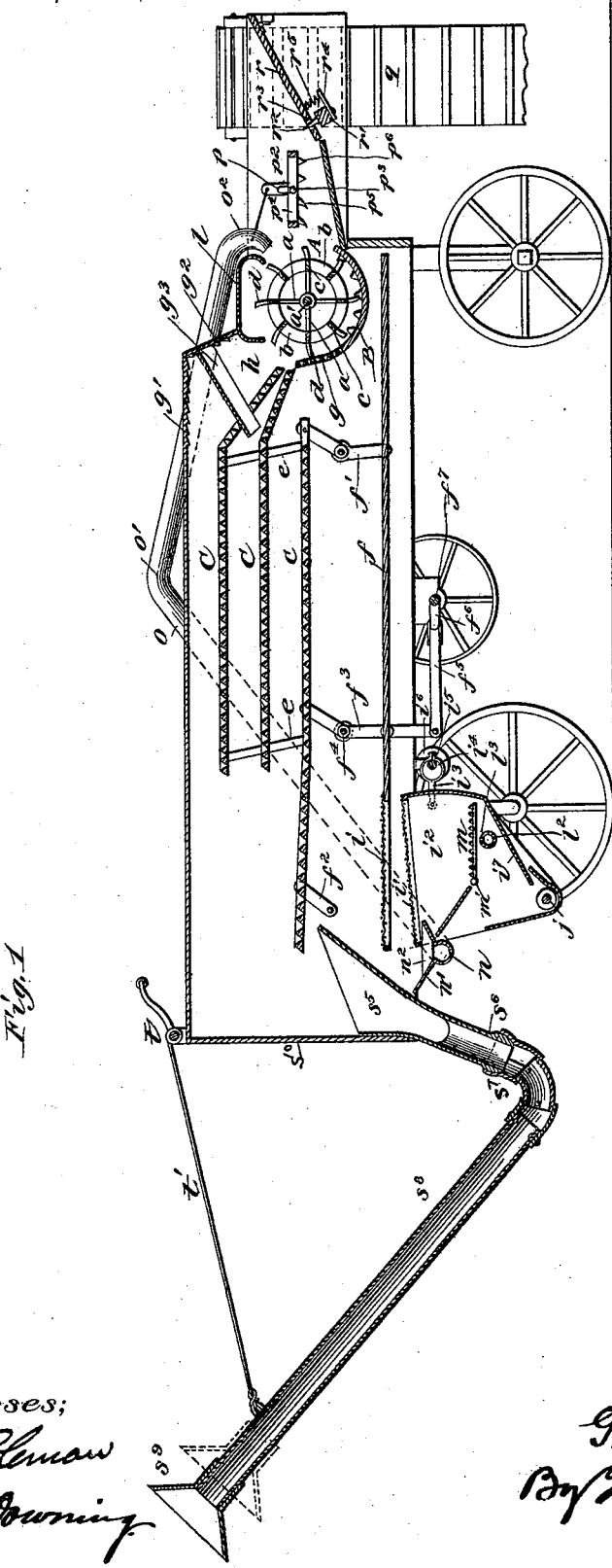

(No Model.) 4 Sheets—Sheet 1.

G. F. CONNER.
THRASHING MACHINE.

No. 552,275. Patented Dec. 31, 1895.

Witnesses:
J. F. Coleman
G. F. Downing

Inventor
G. F. Conner
By H. A. Seymour
Atty.

(No Model.) 4 Sheets—Sheet 4.
G. F. CONNER.
THRASHING MACHINE.
No. 552,275. Patented Dec. 31, 1895.
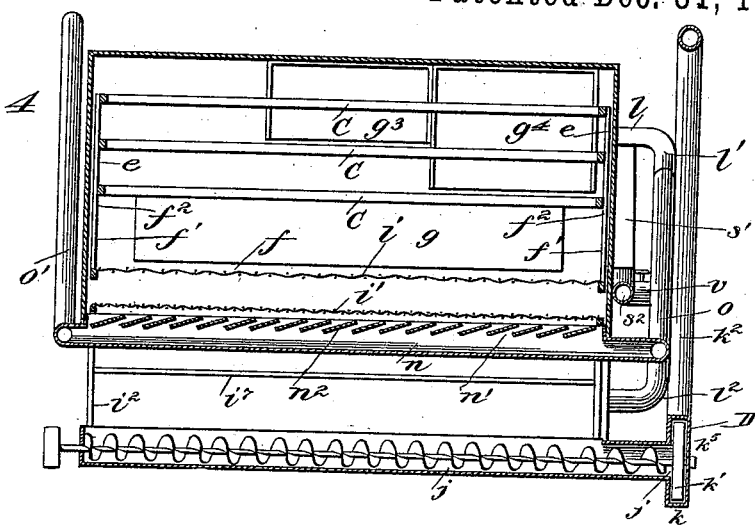
Fig. 4
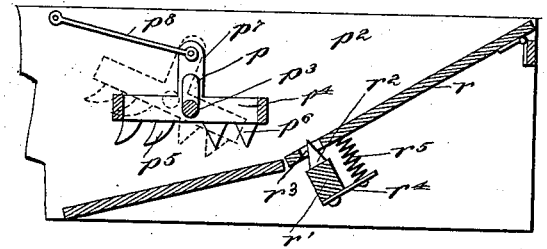
Fig. 5
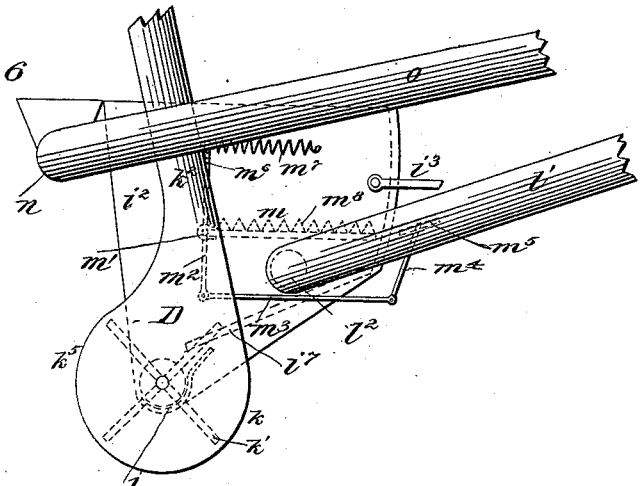
Fig. 6
Fig. 7
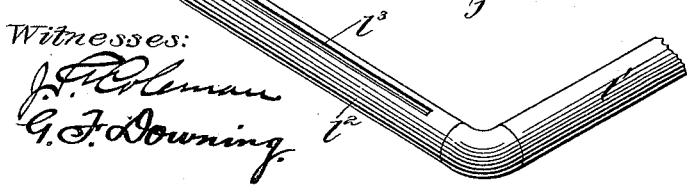
Witnesses:
J. P. Coleman
G. F. Downing
Inventor
G. F. Conner
By K. A. Seymour
Atty.

UNITED STATES PATENT OFFICE.

GEORGE F. CONNER, OF RACINE, WISCONSIN.

THRASHING-MACHINE.

SPECIFICATION forming part of Letters Patent No. 552,275, dated December 31, 1895.

Application filed December 14, 1894. Serial No. 531,812. (No model.)

*To all whom it may concern:*

Be it known that I, GEORGE F. CONNER, a resident of Racine, in the county of Racine and State of Wisconsin, have invented certain new and useful Improvements in Thrashing-Machines; and I do hereby declare the following to be a full, clear, and exact description of the invention, such as will enable others skilled in the art to which it appertains to make and use the same.

My invention relates to an improvement in thrashing-machines.

In the operation of thrashing-machines as heretofore constructed the grain passes from the thrashing-cylinder over or under a beater and then onto a rack, the latter being usually made of a series of slats or a frame covered with suitable perforated material. In passing over this rack (which is made to reciprocate) the grain passes through the same and the straw moves onward to a straw-carrier. Such construction is subject to serious objections, especially when the machine is operated rapidly. In fast thrashing the column of straw passing over the rack being very thick the grain will not be thoroughly shaken out.

One object of my invention is to obviate this and other defects in thrashing-machines as they have heretofore been constructed, and to produce means whereby the body of straw and grain, when it leaves the thrashing-cylinder, will be divided into two or more parts, and each part be agitated independently of the other parts to separate the grain from the straw.

A further object is to so construct a thrashing-machine that the body of straw and grain will be delivered from the thrashing-cylinder onto a series of two or more movable racks arranged one above the other, so as to divide the body of grain and straw into several parts, while the grain is being separated from the straw, whereby to insure thorough separation.

A further object is to so construct a thrashing-machine that the body of grain and straw will be divided into several layers as they leave the thrashing-cylinder, and so that a blast created by the thrashing-cylinder will be made to pass through and between the several layers of straw and grain while the latter are being separated one from the other.

A further object is to provide efficient pneumatic devices whereby to cause the tailings to be reconveyed to the thrashing-cylinder.

A further object is to produce simple and efficient devices for discharging the cleaned grain from the machine.

A further object is to construct a thrashing-machine with a pneumatic stacker which shall be so constructed that the passage of all the straw through it will be insured and the backward escape of straw effectually prevented.

A further object is to so construct a pneumatic stacker for a thrashing-machine that the blast, as it enters the inlet of the stacker, shall be such that it will be positively directed into the outlet-pipe of the stacker in line with the travel of the straw into the same.

A further object is to improve a thrashing-machine in other particulars which will be hereinafter explained, and to produce a machine which shall be comparatively simple in construction and effectual in the performance of its functions.

With these objects in view the invention consists in certain novel features of construction and combinations and arrangements of parts, as hereinafter set forth, and pointed out in the claims.

Figure 2:
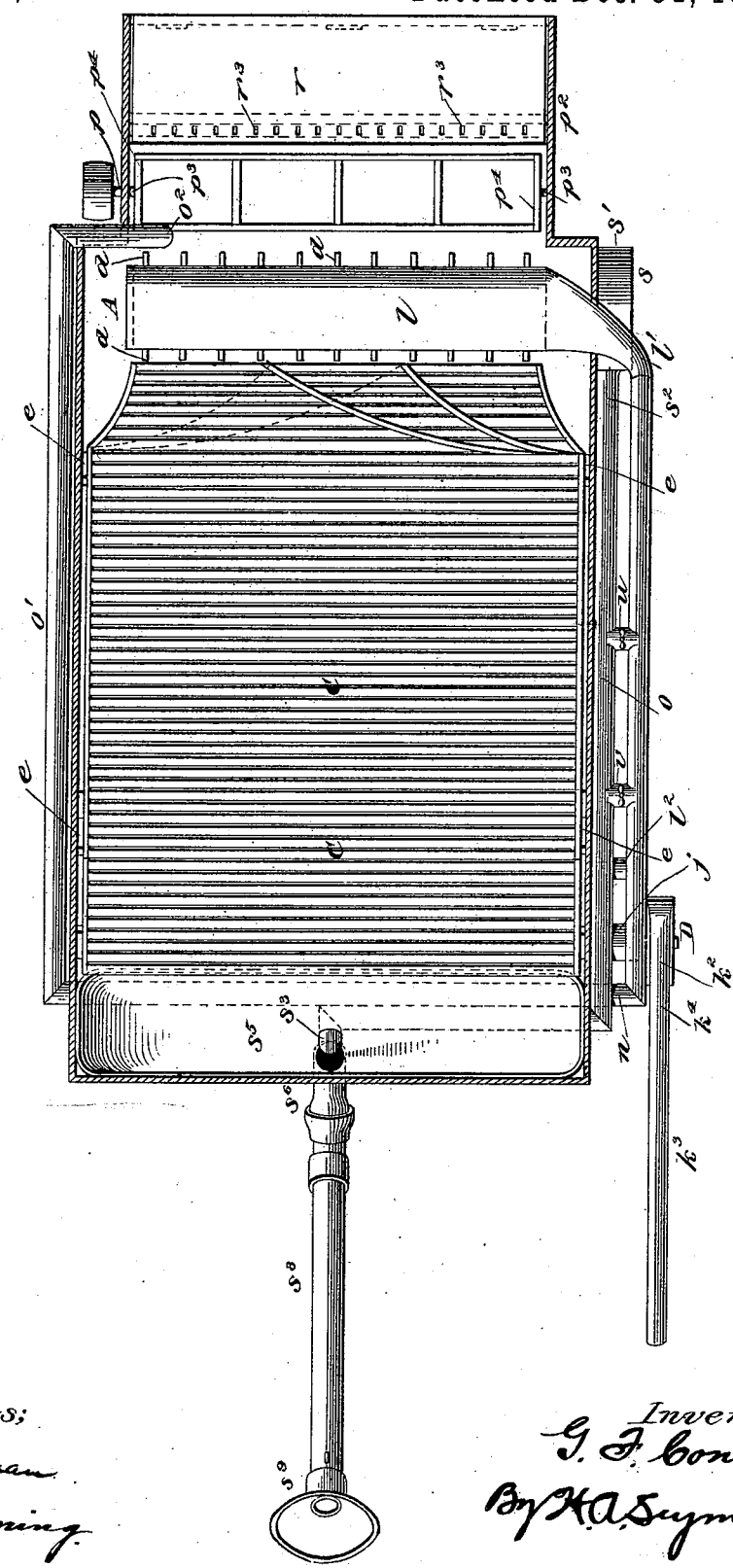
Figure 3:
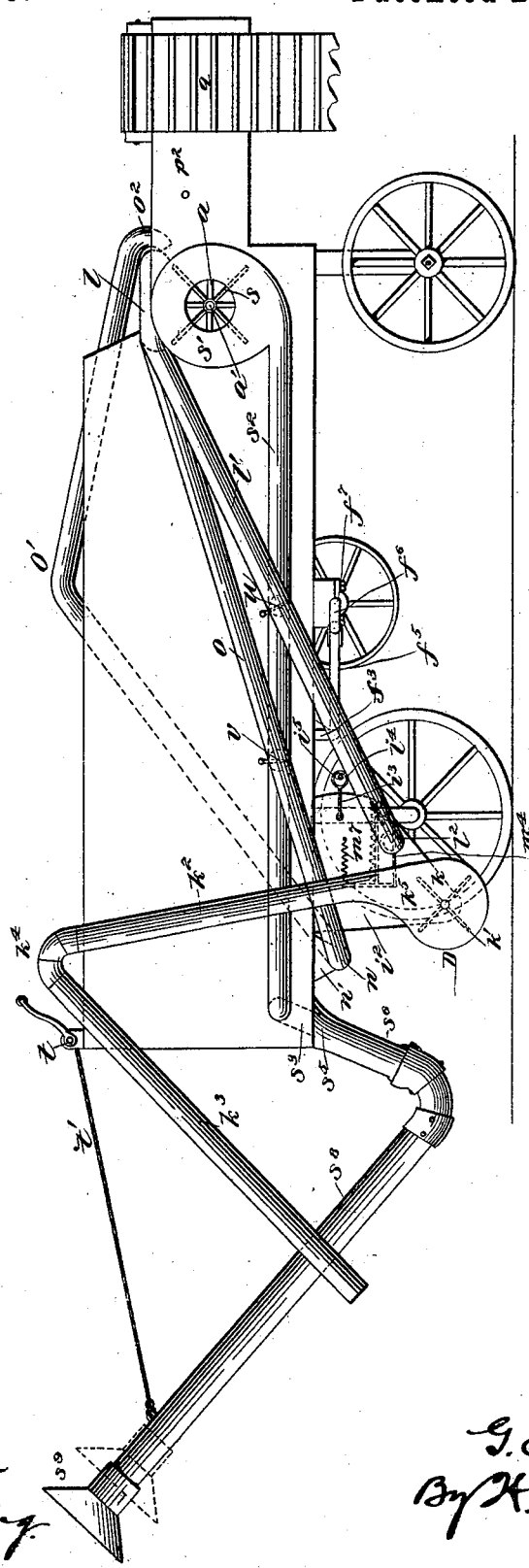

In the accompanying drawings, Figure 1 is a sectional view of my improved thrashing-machine. Fig. 2 is a plan view. Fig. 3 is a side elevation. Fig. 4 is a cross-section. Figs. 5, 6, and 7 are detail views.

A represents a thrashing-cylinder and B the concave, the latter being constructed in any preferred manner. The cylinder A comprises ends or heads of crossed bars $a\,a$, secured to a shaft $a'$, rims $b$, secured to said cross-bars $a$, a series of longitudinal bars $c$, spaced apart and secured at their ends to said rims, and teeth $d$, secured to said longitudinal bars. From the construction and arrangement of parts it will be seen that, as both ends of the cylinder A are open, air will be permitted to enter the same, and this air, as it escapes through the spaces between the longitudinal bars $c$, will be met by said bars during the revolution of the cylinder and driven into and through the machine in a manner hereinafter explained, the thrashing-cylinder A thus constituting a blower.

Within the framework of the machine a series of two or more (three being shown in the drawings) movable or reciprocating racks C are disposed, one above the other, each of said racks comprising a number of slats or bars spaced apart, (and preferably made V-shaped in cross-section,) and the various racks are connected together by switch-connecting bars $e$, so that they can be reciprocated simultaneously by means of the same operating devices.

A reciprocating grain-table $f$ is disposed beneath the racks C for the reception of the shelled grain falling therefrom. This feed-table is connected with the forward end of the lower rack through the medium of a bell-crank $f'$ and the rear end of the lower rack is supported by a pivoted link $f^2$. Between the ends of the lower rack one end of a lever $f^3$ is pivoted thereto, said lever having its fulcrum at $f^4$ in the framework of the machine, and at its lower end is pivotally connected to a pitman $f^5$, which receives its motion from a crank-arm $f^6$, carried by a shaft $f^7$.

When three racks C are employed the forward end of each rack is contracted, so as to receive grain from one-third of the cylinder, as shown in Fig. 2, the grain, after reaching the main portion of the rack, (which extends the full width of the machine,) being spread out in a thin layer over the rack, so that the air-blast from the thrashing-cylinder will pass through it and assist in maintaining it loose and in condition to be separated.

During the revolution of the thrashing-cylinder loose grain is apt to be driven with considerable force from the cylinder to the rear portion of the machine without passing through the racks and cleaning devices, and consequently failing to enter the grain-delivery devices. To prevent this and to cause the grain to fall upon the respective racks I provide a frame or grate $g$ secured in rear of the thrashing-cylinder and abutting against the rear end of the concave B, said frame or grate being adapted to direct the grain as it leaves the cylinder toward the top of the machine, where it will be met by a series of serrations or teeth $g'$ $g^2$ made on the under face of the top of the casing of the machine and the upper portion of the front end thereof, or on suitable boards secured thereto. The serrations or teeth $g'$ will check the passage of the loose flying grain and straw leaving the thrashing-cylinder from the part thereof which communicates with the upper rack, and cause such loose grain and straw to fall upon such upper rack. The grain and straw leaving the cylinder from the parts thereof which communicate with the bottom and central racks will first strike the serrations $g^2$ and by them be deflected and made to strike boxes or deflectors $g^3$ $g^4$, which latter communicate with the lower and middle racks, respectively, and direct the grain and straw thereto. Not only will loose grain be forced to the upper part of the machine, but a large amount of the straw will also be forced with the grain to the upper part of the machine and be directed into the racks in the same manner. After the grain and straw leave the thrashing-cylinder they must fill the space $h$, Fig. 1, before they reach the respective racks, and while they are passing through this space a blast of air from the thrashing-cylinder passes through them, which blast acts to blow off some of the light chaff and straw and permit some of the grain to fall freely through the interstices of the racks and onto the grain-table below. Much time will thus be saved in separating a given quantity of grain, as much of the loose grain will be permitted to reach the grain-table by falling directly through the series of racks, and not gradually one after another as usual.

The shelled grain on the grain-table will be gradually fed rearwardly by the reciprocation of the latter to a sieve $i$ at the rear end thereof. The grain will pass through the meshes of this sieve onto a sieve $i'$ secured in the upper part of a swinging shoe $i^2$. To this shoe a strap $i^3$ is secured, which at its free end embraces a cam or crank arm $i^4$ carried by a shaft $i^5$ mounted in the framework of the machine. When the shaft $i^5$ is rotated by means of a suitable strap passing over a pulley $i^6$ on said shaft, it will be seen that a vibrating motion will be imparted to the shoe through the medium of the cam $i^4$ and strap $i^3$. During the vibration of the shoe the grain will fall through the meshes of the sieve $i'$ and finally reach the inclined bottom $i^7$ of the shoe, from which it will pass to a screw conveyer $j$ disposed transversely on the machine at the lower edge of said inclined bottom $i^7$. The conveyer $j$ will deliver the grain through an opening $j'$ into the center of an ejector D. This ejector comprises a casing $k$ and a series of flat wings $k'$, secured to the end of the screw conveyer which projects into said casing. With the periphery of the casing $k$ an upwardly-projecting inclined pipe $k^2$ communicates and preferably extends above the top of the framework of the machine. To the upper end of the pipe $k^2$ a pipe $k^3$ is loosely connected by means of an elbow $k^4$ and projects from the machine in an inclined direction, the loose connection of said pipe $k^3$ with the pipe $k^2$ permitting the former to be moved so as to direct the discharge of grain to any desired point. At or near where the casing $k$ communicates with the pipe $k^2$ the latter is made with an enlargement $k^5$, which communicates with the screw conveyer $j$, so as to direct thereinto any grain which might fall. By thus arranging the conveyer and the grain-ejector both can be driven by the same belt and pulley.

The shelled grain from the spiral conveyer $j$ enters the center of ejector and during the rapid rotation of the wings $k'$ will by centrifugal force be thrown to the outer edges of said wings and by said wings will be forced around the casing to the outlet thereof which communicates with the pipe $k^2$, the grain being thus made to enter said pipe with sufficient force to cause it to pass to the top thereof and enter the inclined discharge-pipe $k^3$, through which it will pass to the device provided for its reception.

A casing $l$ is disposed over the thrashing-cylinder and adapted to receive a portion of the blast created by said cylinder. With the casing $l$ a pipe $l'$ communicates and extends to a point below the sieves $i$ $i'$, where it communicates with a transverse pipe $l^2$ disposed under said sieves, said transverse pipe having a slot $l^3$ adapted to discharge the air-blast upwardly and blow off the chaff which may find its way to said sieves. It might occur that the air-blast through the sieves will become too strong and act to blow off some of the grain with the chaff. To prevent this and provide means for automatically regulating the air-blast, I provide a governor constructed and operating in a manner which will now be explained. A rack or governor $m$ composed of a series of spaced bars $m^8$ made $\wedge$-shaped in cross-section is disposed over the slotted pipe $l^2$ and pivotally connected at one edge to the frame of the machine by means of a suitable rod or shaft $m'$. The rod or shaft $m'$ is provided with an arm $m^2$, to which one end of a rod $m^3$ is connected, the other end of said rod being pivotally attached to an arm $m^4$, secured to the shaft or stem of a valve $m^5$ located in a pipe $l'$. Another arm $m^6$ projects from the rod or shaft $m'$ of the rack or governor $m$ and to this arm an adjustable spring $m^7$ is connected, whereby to maintain the rack or governor in its normal position under a predetermined pressure of the air-blast. From this construction and arrangement of parts it will be seen that the air-blast from the pipe $l^2$ will pass up through the rack or governor $m$ and exert a limited pressure against the flat under faces of the slats or bars $m^8$. When the air-pressure against said bars $m^8$ becomes excessive so as to raise the rack or governor against the resistance offered by its own weight and the resistance of the spring (or weight) $m^7$, the rising of the rack or governor will cause the valve $m^5$ to be closed (through the medium of the intermediate devices above described) to an extent commensurate with the excess of air-pressure and thus restrict the blast through the pipe $l'$. When the blast becomes reduced to its normal velocity, the rack or governor will fall, owing to the removal of the excessive air-pressure against it, and the valve in the pipe $l'$ will be again opened to its full extent.

My improvements in a thrashing-machine also contemplate means for reconveying the tailings to the thrashing-cylinder so that they will be again passed through the same, and in conjunction with said reconveying apparatus I employ a feeding device which serves not only primarily to feed the grain to the thrashing-cylinder but to insure the proper entrance of the reconveyed tailings between the cylinder and concave. These appliances I will now explain.

A transverse pipe or trough $n$ is disposed under the end of the lower sieve and provided with a hopper $n'$ to direct the tailings thereinto. A series of slats $n^2$ are located in the opening of the pipe or trough $n$ and disposed in an inclined position so as to prevent the air-blast (which enters said pipe or trough as presently explained) from blowing the tailings out of the trough. With one end of the pipe or trough $n$ one end of a pipe $o$ communicates, the other end of said pipe communicating with the blast-pipe $l'$. A pipe $o'$ communicates with the other end of the pipe or trough $n$ and extends, first, in an upwardly and forwardly direction, and then in a forwardly and downwardly direction, said pipe $o'$ terminating in front of the thrashing-cylinder in a downwardly and preferably slightly rearwardly projecting spout $o^2$. Now it will be seen that a portion of the blast passing from the thrashing-cylinder through the pipe $l'$ will pass through the pipe $o$ to one end of the pipe or trough $n$. As this blast passes through the pipe or trough $n$ it will meet the tailings entering the same and carry them up through the pipe $o'$, from which latter said tailings will be discharged through the spout $o^2$ in front of the thrashing-cylinder and tend to enter between the same and the concave, but the feeding device above referred to will be employed to insure such entrance. In constituting this feeder, a crank-shaft $p$ is employed and mounted in the feeder-frame $p^2$. To the crank-arm $p^3$ of this crank-shaft a bar $p^4$ is connected at a point between its ends, and said bar is provided with a series of feeder-fingers $p^5$ at one side of the connection of the bar with the crank-shaft. To the other end of said bar a series of knives $p^6$ are secured for cutting the bands of the bundles of grain as the same are fed to the machine, and also to assist in such feeding. From the bar $p^4$ a fixed arm $p^7$ projects upwardly, and to the upper end of said arm one end of a rod $p^8$ is connected, the other end of said rod being connected to the feeder-frame. From this construction of parts it will be seen that, as the shaft $p'$ rotates, a reciprocating and a rocking motion will be imparted to the bar $p^4$ and the feeder fingers or teeth $p^5$ made to insure the entrance of the tailings between the cylinder and concave, all rocking motion of the bar $p^4$ independently of the motion imparted by the motion of the crank-arm being prevented by rod $p^8$. The feeder-fingers will of course also assist in feeding the grain when it first enters the machine, and the bundles of grain will be supplied to the feeder-frame $p^2$ by means of carriers $q$, the frames of which are pivotally connected to the feeder-frame and project laterally from the same. The bundles of grain will be delivered by the carriers $q$ onto the inclined bottom $r$ of the feeder-frame $p^2$, said bottom being hinged at its upper end. Under the hinged bottom $r$, near the lower end thereof, a fixed bar $r'$ is located and provided with a series of pointed teeth $r^2$ adapted to pass through perforations $r^3$ in the hinged bottom. An arm $r^4$ projects from the bar $r'$, and between said bar and the hinged bottom $r$ a spring $r^5$ is disposed and adapted to normally maintain said bottom in such position that the teeth $r^2$ will not project beyond the upper face of said hinged bottom.

During the operation of the machine the inner end of the feeder-bar $p^4$ will move to a point over the lower end of the hinged bottom $r$ and over the points of the teeth projecting through the same. The hinged bottom $r$ is so disposed normally that a bundle of grain can pass between it and the feed-bar $p^2$, so that the band of the bundle will be cut by the knives on said bar, and the grain be fed onward by the feeder-fingers assisted by said knives. When an abnormally large bundle reaches the feeder-bar, the hinged bottom $r$ will yield against the action of the spring $r^5$, and thus cause the teeth $r^2$ to project beyond the upper face of said hinged bottom and engage the bottom of the bundle of grain, thus retarding the movement thereof, while the upper portion of the bundle is fed forward to the cylinder by the feeder, the blast from the pipe serving to assist in the feeding of the grain to the cylinder.

In conjunction with the appliances hereinbefore described for separating the grain from the straw, cleaning and ejecting the grain and repassing the tailings through the machine, I employ simple and efficient apparatus for expelling the straw from the machine and stacking it, a description of which apparatus will now follow.

On the shaft of the thrashing-cylinder A a fan or blower $s$ is secured, and with the casing $s'$ of this fan a pipe $s^2$ communicates, said pipe terminating in close proximity to the rear end of the machine, where it is provided with a downwardly-projecting spout or outlet $s^3$. The spout or outlet $s^3$ is adapted to discharge into a hopper $s^5$ disposed beneath it and located at the upper end of a pipe $s^6$. The downwardly-extending pipe $s^6$ communicates by means of a movable coupling $s^7$ with a long upwardly and rearwardly projecting stacker $s^8$, with the free end of which a flaring spreader $s^9$ is loosely connected. When straw and chaff are discharged through the pipe $s^6$ (in a manner presently explained) and it is desired that the straw shall be deposited and scattered or spread in proximity to the machine, the spreader $s^9$ is arranged as shown in full lines in Figs. 1, 2 and 3. When it is desired that the straw be thrown a distance from the machine, the spreader $s^9$ will be shipped back, as shown in dotted lines in Figs. 1 and 2, so that the straw will be discharged with force through the end of the pipe $s^8$ without coming into contact with the spreader.

From the construction and arrangement of the straw-ejecting devices, as above described, it will be seen that the straw from the bottom rack C and the chaff from the sieve $i$ will fall into the hopper $s^5$ and enter the pipe $s^6$, through which and the stacker-pipe it will be forced by the blast of air supplied by the blower $s$ and discharging into the hopper $s^5$ in the same direction as the passage of the straw thereto. Now it will be observed that the straw will fall from the end of the bottom rack and will be prevented from passing over the hopper $s^5$ by the upwardly-extending end $s^{10}$ of the machine. The straw is compelled therefore to fall into said hopper $s^5$. As soon as the straw enters the hopper $s^5$ it will commingle with the blast from the spout or outlet $s^3$ and be thereby forced through the pipes $s^6$ $s^8$. In view of the fact that the blast enters the hopper $s^5$ in the same direction in which the straw enters said hopper, the straw cannot re-enter the machine, as it often does when a fan-blower is employed, and this is quite an important feature.

A drum or roller $t$ is mounted on the framework of the machine at the rear end thereof and provided at its ends with suitable crank-arms by which to operate it. On the respective ends of this drum or roller ropes or cords $t'$ are wound, the free ends of said ropes or cords being secured to the stacker-pipe $s^8$.

By turning the drum or roller in one direction or the other the stacker-pipe $s^8$ will be swung around on the movable joint $s^7$ so that the stacker-pipe can be made to discharge in any desired direction, the spout $s^3$ always maintaining the proper relation to the hopper $s^5$. The stacker-pipe may also be raised or lowered on said universal joint.

The pipe $l'$, which supplies the blast under the sieves $i$ $i'$, passes in close proximity to the blast-pipe $s^2$ of the straw-ejecting devices, and said pipes are connected together and communication between them is normally closed by a valve $u$. By the provision of this valve a portion of the air passing through the pipe $s^2$ can be made to enter the pipe $l'$ when the blast furnished by the thrashing-cylinder is insufficient in force to properly clean the grain on the sieves $i$ $i'$. The pipe $o$ is also connected with the pipe $s^2$ and communication between them is normally closed by a valve $v$. By means of this valve a portion of the air passing through the pipe $s^2$ can be made to enter the pipe $o$ and assist in the operation of the reconveying devices for the tailings when the blast furnished by the thrashing-cylinder proves insufficient.

Various slight changes might be made in the details of construction of my invention without departing from the spirit thereof or limiting its scope, and hence I do not wish to limit myself to the precise details of construction herein set forth; but, Having fully described my invention, what I claim as new, and desire to secure by Letters Patent, is—

1. In a thrashing machine, the combination with a concave, of a cylinder comprising a central shaft, rings, spokes connecting the latter to the shaft, bars extending across from ring to ring and located away from the shaft and teeth on the said bars, the cylinder serving the double function of thrashing out the grain and drawing air in at its center and forcing it out radially, substantially as set forth.

2. In a thrashing machine, the combination with a concave, and a grate at the rear thereof, of a cylinder comprising a central shaft, rings, spokes connecting the latter to the shaft, bars extending across from ring to ring and located away from the shaft, and teeth on the said bars, the cylinder serving the combined function of thrashing out the grain and drawing air in at its center and forcing it out radially, substantially as set forth.

3. In a thrashing machine, the combination with a cylinder, and concave, of a series of racks the forward ends of which are located in proximity to the cylinder the forward ends of the upper one or ones contracted to expose the one or ones beneath so as to catch straw or grain falling at that point, substantially as set forth.

4. In a thrashing machine, the combination with a cylinder, and concave, of a series of racks arranged one above another, the forward ends of these racks contracted and located close to the cylinder so that a supply of straw and grain is received directly and simultaneously from the cylinder upon the several racks, substantially as set forth.

5. In a thrashing machine, the combination with a cylinder and concave, of a series of racks arranged one above another, their forward ends adjacent to the cylinder and in the same or substantially the same vertical plane, the forward ends of the upper racks contracted so that the several racks receive a substantially uniform supply of grain and straw directly and simultaneously from the cylinder, substantially as set forth.

6. In a thrashing machine, the combination with a cylinder, and concave, of a series of racks arranged one above another, the forward ends of the several racks adjacent to the cylinder, the upper ones contracted whereby the lower ones have a portion exposed to falling grain or straw, and a frame located rearward of the concave and extending upward to deflect straw and grain leaving the cylinder upward whereby it falls upon the several racks, substantially as set forth.

7. In a thrashing machine, the combination with a cylinder, a concave, and a frame located rearward of the cylinder and disposed in an upwardly direction to deflect material passing from the cylinder upward, of a series of racks located one above another, the upper one contracted whereby each has a portion of its forward end exposed to receive falling grain and straw, and deflecting means located above the cylinder and forward ends of the racks to deflect downward upon the exposed ends of the several racks, grain and straw which are thrown upward against said deflectors, substantially as set forth.

8. In a thrashing machine, the combination with a thrashing cylinder, and a rack adapted to receive grain and straw from the thrashing cylinder, of a series of serrations on the under face of the machine top adapted to arrest grain thrown off of the thrashing cylinder and prevent it from passing over the rack, and a deflecting frame or grate located in rear of cylinder and disposed upwardly to cause the grain and straw upon leaving the cylinder to pass to the top of the machine and thence descend by gravity upon the racks, substantially as set forth.

9. In a thrashing machine, the combination with a thrashing cylinder, and a rack adapted to receive grain and straw therefrom, of serrations on the under face of the machine top adapted to arrest the grain thrown off by the thrashing cylinder, a deflecting frame located at rear of cylinder and disposed upwardly, and a box or deflector constructed and adapted to direct the grain to the rack, substantially as set forth.

10. In a thrashing machine, the combination with a series of racks, one above another the upper one contracted at the forward ends and each adapted to receive grain from a thrashing cylinder, of a thrashing cylinder constructed and adapted to force a blast of air through the grain before it reaches the racks and also through and between said racks, substantially as set forth.

11. In a thrashing machine, the combination with a cylinder, and a series of racks adapted to receive grain and straw therefrom, the forward ends of the upper racks being contracted, of means for directing grain from the cylinder toward the top of the machine, and a series of serrations on the under face of the machine top adapted to arrest the grain thrown by the cylinder and prevent it from passing over the rack, substantially as set forth.

12. In a thrashing machine, the combination with a cylinder, a concave, and a series of racks arranged one above another, the forward ends of the upper racks contracted whereby all are adapted to receive grain from the thrashing cylinder, of a frame or grate adjacent to the rear edge of the concave and adapted to direct the grain and straw toward the top of the machine, serrations on the under face of the machine top to arrest the grain and straw, and means for directing the grain and straw onto the respective racks, substantially as set forth.

13. In a thrashing machine, the combination with a thrashing cylinder, of a series of racks arranged one above another and each of a width equal to that of the thrashing machine and the upper ones having a contracted portion adapted to receive grain and straw directly from a certain part of the thrashing cylinder, substantially as set forth.

14. In a thrashing machine, the combination with the cleaning sieves, and an air blast pipe, of a pivoted device over the outlet of said blast pipe, said device having openings formed therein for the passage of air therethrough, a valve in said pipe, and connections between said valve and pivoted device, substantially as set forth.

15. In a thrashing machine, the combination with the cleaning sieves, and a blast pipe adapted to discharge under the same, of a pivoted device over the outlet of the blast pipe, said device having openings therein for the passage of air therethrough, a valve in said pipe, connections between said valve and pivoted device, and means for regulating the resistance of said pivoted device to the air blast, substantially as set forth.

16. In a thrashing machine, the combination with the cleaning sieves, and a blast pipe adapted to discharge under the same, of a rack comprising spaced bars, pivoted over the outlet of the blast pipe, an arm carried by said rack, a valve in the blast pipe, an arm carried by said valve, and a rod connecting said arms, substantially as set forth.

17. The combination with cleaning sieves, and an air pipe passing in proximity thereto and discharging in the direction of the sieves throughout the length of the latter, of a governor having openings therein, the governor hinged in position and located between the sieves and the discharge pipe, said governor constructed to allow air to pass through it and adapted to be moved from its normal position when the air pressure becomes excessive, and a valve in the pipe connected with the governor whereby it is operated and controlled by the movements of the governor when the latter leaves its normal position, substantially as set forth.

18. The combination with a pair of shaking sieves in juxtaposition and operated independently of each other and with distinct movements, and an air discharge pipe constructed and adapted to discharge in the direction of the sieves and throughout their entire length, or substantially so, of a slotted governor interposed between the discharge pipe and the sieves, a valve in the pipe, and means connecting the valve and governor together whereby the operation of the valve is dependent upon the movement of the governor, substantially as set forth.

19. In a thrashing machine, the combination with the cleaning sieves, and a blast pipe adapted to discharge under the same, of a rack composed of a series of spaced bars made Λ-shaped in cross section and having flat bottoms, pivoted above this outlet of the blast pipe, a valve in the blast pipe, and connections between said pivoted rack and said valve, substantially as set forth.

20. In a thrashing machine, the combination with the cleaning sieves, and a thrashing cylinder adapted to produce an air blast, of a pipe adapted to receive the air blast from the thrashing cylinder and convey it under said cleaning sieves, a pivoted slotted device over the outlet of said pipe, a valve in the pipe, and connections between the pivoted device and valve, substantially as set forth.

21. In a thrashing machine, the combination with a vibratory shoe, and a sieve therein, of a blast pipe adapted to discharge under said sieve, a slatted rack pivotally supported in the shoe over the discharge of said pipe, a valve in the pipe, and connections between said valve and pivoted rack, substantially as set forth.

22. In a thrashing machine, the combination with the cylinder, and concave, of a trough at the rear end of the machine extending across from side to side into which the tailings pass, a pipe leading from one end of this trough to the cylinder and an air blast pipe adapted to discharge into the opposite end of the trough to force the tailings therethrough and out through the pipe which leads back to the cylinder, substantially as set forth.

23. In a thrashing machine, the combination with a cylinder, and concave, of a trough located at the rear end of the machine and extending across the latter, inclining slats located over this trough, a pipe leading from one end of the trough to the cylinder, and an air blast pipe discharging into the opposite end of said trough, the inclining slats arranged to prevent the air fed into the trough from entering the machine, and to cause a suction upon the tailings whereby to draw them into the trough and force them out through the pipe which returns to the cylinder, substantially as set forth.

24. In a thrashing machine the combination with a hopper adapted to receive straw, of a blast pipe adapted to discharge into said hopper, a pipe communicating with said hopper, a stacker pipe communicating with said last mentioned pipe, and an adjustable sliding spreader connected to the free end of said stacker pipe, substantially as set forth.

25. In a thrashing machine, the combination with cleaning sieves, a reconveyer for tailings, and a straw ejecting device, of pipes for supplying blasts of air to operate said appliances and valves in said pipes where they cross, so that air may be allowed to pass from one pipe to supply a deficiency of air blast in another, substantially as set forth.

26. In a thrashing machine, the combination with a cylinder constructed to constitute a blower, of a discharge hopper, a pipe leading from the cylinder to the hopper for conducting air directly from the cylinder to the hopper to cause a discharge of straw therethrough, substantially as set forth.

27. In a thrashing machine, the combination with a cylinder, constructed to constitute a blower, a discharge pipe, a receptacle for tailings and pipes leading from the cylinder to the discharge pipe and the tailings receptacle, of a pipe connecting said pipes, and a valve in the connecting pipe to admit or shut off air from one pipe to the other, substantially as set forth.

28. In a thrashing machine, the combination with a cylinder, constructed to constitute a fan, of pipes leading from this cylinder to different parts of the machine, passage ways for connecting these pipes and valves therein for causing or preventing communication from one pipe to the other, substantially as set forth.

In testimony whereof I have signed this specification in the presence of two subscribing witnesses.

GEORGE F. CONNER.

Witnesses:
R. S. FERGUSON,
J. FRED. KELLEY.